March 23, 1965 J. P. KELTNER 3,175,192

SELECTIVE DECODER UTILIZING PLURAL FREQUENCY REEDS

Filed July 20, 1962

INVENTOR.

JAMES P. KELTNER

BY

McMorrow, Berman + Davidson

ATTORNEYS

United States Patent Office 3,175,192
Patented Mar. 23, 1965

3,175,192
SELECTIVE DECODER UTILIZING PLURAL FREQUENCY REEDS

James P. Keltner, 3012 Tanforan Drive, Littleton, Colo.
Filed July 20, 1962, Ser. No. 211,285
11 Claims. (Cl. 340—164)

This invention relates to signalling systems, and more particularly to a system wherein a sequence of tone frequencies is employed to select or operate a particular individual unit from a number of such units connected to the system or in communication therewith.

A main object of the invention is to provide a novel and improved selective decoding system wherein a sequence of tone frequencies is employed to select one of many individual receiving units of the system, the decoding apparatus being relatively simple in construction, being reliable in operation, and being particularly useful for selective radio paging systems, or similar systems, where it is desirable to provide facilities for calling any individual page receiver, for calling any group of a number of groups, or under certain circumstances, for calling all the receivers in the system.

A further object of the invention is to provide an improved device for decoding a sequence of tone frequencies in such a manner that individual units of apparatus associated with decoding devices according to the present invention may be selectively operated in a positive and reliable manner, the apparatus being usable, for example, in selective radio page systems, or in safety systems, such as missile self-destruct systems, wherein a certain coding of tones is employed to energize a specific circuit.

A still further object of the invention is to provide an improved tone sequence-responsive multiple-stage decoding device which may be employed with various individual units, so that by providing a particular sequence of tones a certain individual unit may be turned on, or various selected groups of units may be turned on, said decoding apparatus involving inexpensive components, being compact in size, being economical to operate, and each decoding device in the system employing same being responsive only to one combination of a wide range of possible combinations of tones.

Further objects and advantages of the invention will become apparent from the following description and claims, and from the accompanying drawings, wherein:

Figures 1, 2:
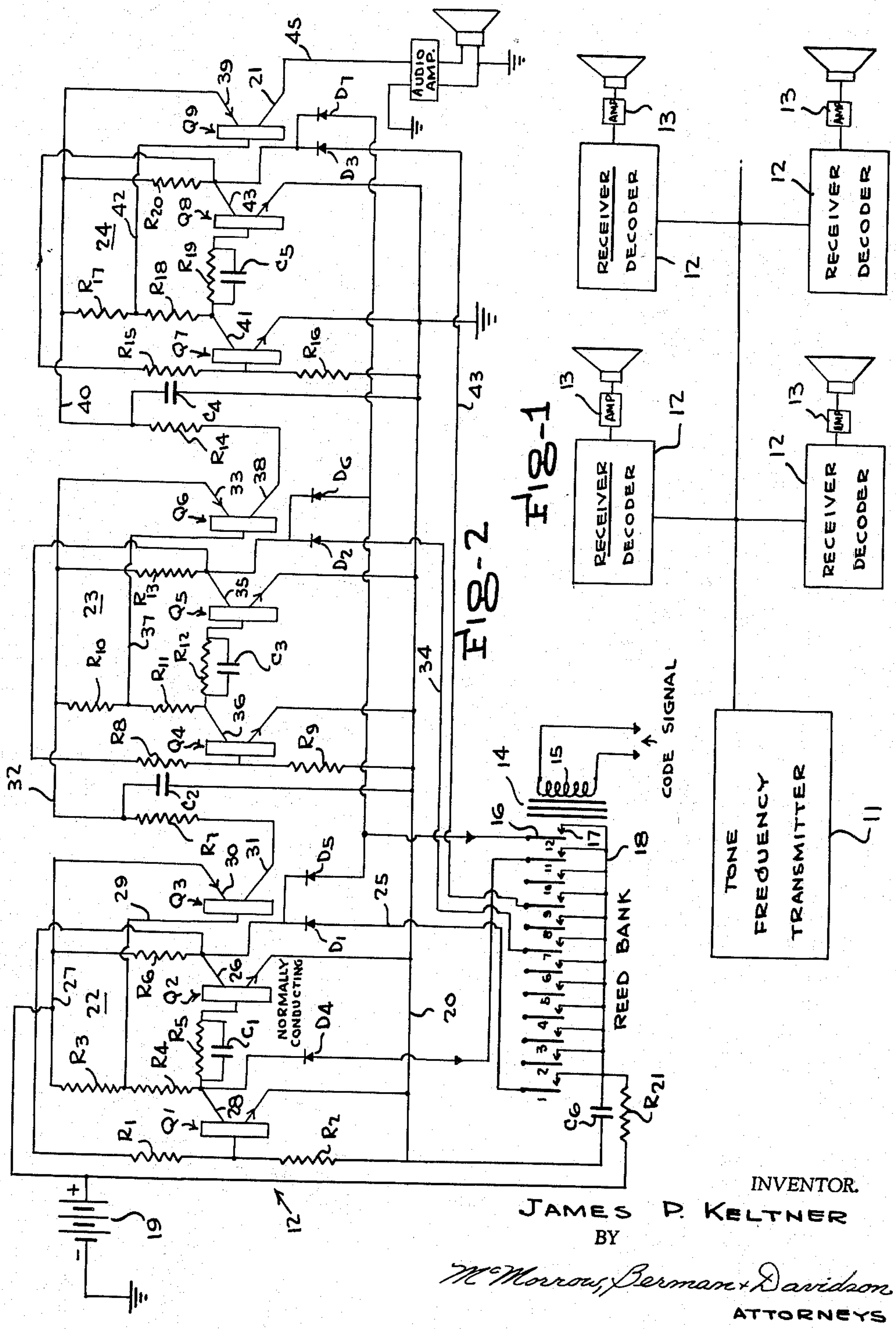
FIGURE 1 is a highly simplified block diagram showing a typical system employing decoding devices according to the present invention, the system showing lines representing communication channels, either wired or radiant energy, from a command transmitter to various decoding receivers of the system.
FIGURE 2 is an electrical wiring diagram showing the electrical connections of the decoding portion of one of the receiving stations of the typical system illustrated in FIGURE 1.

The prime purpose of the present invention is to provide a system provided with a command station which includes a tone frequency transmitter and a large number of receiving stations wherein the tone frequency transmitter emits a number of tone frequencies in sequence and in such a manner that a certain individual receiving station may be called, or an item of equipment associated with said receiving station may be turned on, or alternatively, various selected groups of receiving stations may be called or actuated. The system of the present invention is primarily, but not exclusively, intended for use as a selective radio paging system, in which any individual page receiver may be called, or in which any group or a number of groups may be called, or all receivers may be called simultaneously.

A station selecting system according to the present invention may also be employed in any safety system, such as a missile self-destruct system, in which a certain coding of tones is necessary to energize a remote circuit. Obviously, the system is applicable either to a wired network, wherein the remote stations are connected to the command station by actual conductors, or to a radio network, wherein communication between the command station and the remote receiving stations is by means of radio links.

Referring to the drawings, FIGURE 1 illustrates a typical system, as above described, wherein a command station is provided with a tone frequency transmitter 11 which includes means to emit a series of low frequency tones and to transmit same to the receiving stations associated with the system, illustrated, for example, in FIGURE 1 by the reference numeral 12. In FIGURE 1 the lines connecting the tone frequency transmitter 11 to the receiving stations 12 represent signal transmission channels, which as above mentioned, may comprise either conductors or radio transmission links. In the typical system diagrammatically illustrated in FIGURE 1 the receiving stations are illustrated as provided with output devices consisting of audio amplifiers 13, although it will be readily understood that any other type of device may be operated by each receiving station in place of the audio amplifier diagrammatically illustrated in FIGURE 1.

In the typical system specifically described herein, the tone frequency transmitter 11 is arranged to selectively emit a calling series comprising three spaced tones selected from a group of twelve low frequency tones. The tones may be identified as tones "0" through "12." Tones "0" through "9" represent the digits 0 through 9, while tones "11" and "12" are for other functions which will be presently explained.

Although the present invention basically is adaptable to provide an infinite number of codings, by employing a corresponding number of decades in the system, for purposes of explaining the invention a three decade version thereof is illustrated herein. With three decades, 1000 individual codings are possible. As will be presently explained, the decoding circuit of a receiving station can be wired so as to be energized only by any one combination three tones from 000 to 999. For purposes of explanatory description, it will be assumed that in the typical decoding circuit shown in FIGURE 2, the circuit is designed to respond to a series of three tones corresponding to the number "179".

Referring to FIGURE 2, it will be seen that the receiving circuit 12 comprises a multiple-reed relay 14 having an input winding 15 adapted to receive the code signals transmitted from the tone frequency transmitter 11 of the command station. The vibratory reed relay 14 is provided with a plurality of tone-responsive vibratory contacts 16, each vibratory contact 16 being placed in vibration responsive to the reception of a specific tone frequency by the input winding 15, and when so placed in vibration being engageable with an associated stationary contact 17.

Thus, each of the twelve vibratory contacts 16 of the reed bank relay 14 shown in FIGURE 2 is vibrated when the input winding 15 of the relay receives a particular tone frequency. Since the decoding circuit of FIGURE 2 is intended to respond to the code number "179," the vibratory reeds corresponding to the numbers "1," "7," and "9" are connected into the decoding circuit. The vibratory contact elements corresponding to the numbers "11" and "12" are also connected into the decoding circuit in a manner and for a purpose presently to be described.

It will be seen from FIGURE 2 that all of the stationary contacts 17 of the vibratory reed relay 14 are connected to a common wire 18, said wire being connected through a resistor $R_{21}$ to the positive terminal of a working voltage supply battery 19, or any other suitable direct current source of supply voltage. The negative terminal of the supply battery 19 is connected to ground. A capacitance $C_6$, of relatively small capacity, is connected between the wire 18 and a grounded wire 20, so that the capacitor $C_6$ is charged from the battery 19 through the resistance $R_{21}$ but can be rapidly discharged when a low resistance path is provided between the wire 18 and ground.

As shown in FIGURE 2, the decoding circuit 12 comprises three decades, each decade consisting of a flip-flop bistable circuit and an electronic switch controlled thereby. Thus, in FIGURE 2 the first decade comprises the transistors $Q_1$ and $Q_2$, which comprise a flip-flop bistable circuit, and also an associated electronic switch $Q_3$ comprising a PNP transistor. The second decade comprises the transistors $Q_4$ and $Q_5$, constituting a flip-flop bistable circuit, and an electronic switch $Q_6$, likewise comprising a PNP transistor. The third decade comprises the transistors $Q_7$ and $Q_8$, constituting a flip-flop bistable circuit, and an electronic switch $Q_9$ consisting of a PNP transistor, the collector 21 of which is connected to the ungrounded input terminal of the device to be operated in response to the calling signal, for example, to the ungrounded input terminal of an audio amplifier 13. The remaining input terminal of the device 13 is grounded, as shown.

The first decade of the decoding circuit, is designated generally at 22, the second decade is designated generally at 23 and the third and final decade is designated generally at 24.

The flip-flop bistable circuit comprising the decade 22 is intentially unbalanced by the provision of a suitable bias resistor $R_2$ in the ground return of the base of transistor $Q_1$ so that the transistor $Q_2$ is always the conducting transistor when power is applied to this decade circuit. As shown, the vibratory contact element corresponding to the numeral "1" is connected by a wire 25 through a diode $D_1$ to the collector 26 of transistor $Q_2$ and through a resistor $R_6$ to a wire 27, which is in turn connected to the positive terminal of the supply battery 19. Series-connected resistors $R_3$ and $R_4$ are connected between wire 27 and the collector 28 of transistor $Q_1$. The emitters of transistors $Q_1$ and $Q_2$ are both connected to the common ground wire 20. The collector 26 of transistor $Q_2$ is connected through series-connected resistors $R_1$ and $R_2$ to the ground wire 20, the junction of these resistors being connected to the base of transistor $Q_1$, the resistor $R_2$ being relatively large, as above explained for the purpose of unbalancing the bistable circuit to make transistor $Q_2$ initially conducting.

The collector 28 is connected through the parallel-connected condenser $C_1$ and the resistor $R_5$ to the base of the transistor $Q_2$ for resetting the bistable circuit, as will be presently explained.

The junction of the resistors $R_3$ and $R_4$ is connected by a wire 29 to the base of the PNP electronic switch transistor $Q_3$. The emitter 30 of transistor $Q_3$ is connected to the positive supply voltage wire 27. The collector 31 of transistor $Q_3$ is connected through a resistor $R_7$ and a wire 32 to the emitter 33 of the PNP electronic switch transistor $Q_6$ of decade 23. A condenser $C_2$ is connected between the wire 32 and the ground wire 20, the resistor $R_7$ and the condenser $C_2$ defining a time-delay circuit having a time constant which is relatively long as compared to the period of vibration of the reeds of the relay 14, for a purpose presently to be described.

The decade 23 is similar to the decade 22 in that it comprises the flip-flop bistable circuit consisting of the transistors $Q_4$ and $Q_5$, the reed corresponding to the tone "7" being connected by a wire 34 through a diode $D_2$ to the collector 35 of transistor $Q_5$. Collector 35 is connected through a resistor $R_8$ to the base of transistor $Q_4$, and the base is connected to the ground wire 20 through a resistor $R_9$. The wire 32 is connected to the collector 36 of transistor $Q_4$ through the series-connected resistors $R_{10}$ and $R_{11}$, the junction of said resistors being connected by a wire 37 to the base of transistor $Q_6$. The wire 32 is connected to the collector 35 of transistor $Q_5$ through a resistor $R_{13}$. Collector 36 of transistor $Q_4$ is connected to the base of transistor $Q_5$ through a condenser $C_3$ and a resistor $R_{12}$ connected in parallel, for reset purposes, as will be presently explained.

The collector 38 of the PNP electronic switch transistor $Q_6$ is connected through a resistor $R_{14}$ to the emitter 39 of the PNP electronic switch transistor $Q_9$. A condenser $C_4$ is connected between the emitter wire 40 from resistor $R_{14}$ to the ground wire 20, defining a time delay circuit similar to the time delay circuit defined by resistor $R_7$ and condenser $C_2$, previously described.

Wire 40 is connected to the collector 41 of transistor $Q_7$ through the series-connected resistors $R_{17}$ and $R_{18}$, the junction of said resistors being connected by a wire 42 to the base of the transistor $Q_9$. The reed corresponding to the tone "9" is connected by a wire 43 through a diode $D_3$ to the collector 43 of transistor $Q_8$. Collector 43 is connected through a resistor $R_{20}$ to the wire 40. Collector 43 is also connected to the ground wire 20 through the series-connected resistors $R_{15}$ and $R_{16}$, the junction of said resistors being connected to the base of the transistor $Q_7$.

Collector 41 is connected to the base of transistor $Q_8$ through a condenser $C_5$ and a resistor $R_{19}$ in parallel therewith for resest purposes, as will be presently explained.

The reed associated with the tone "11" is connected through a diode $D_4$ to the collector 28 of the transistor $Q_1$, the tone "11" being employed to reset the decoder 12 in a manner to be presently described.

The reed 16 vibrated by the tone "12" is connected through the respective bypass diodes $D_5$, $D_6$ and $D_7$ to the respective collectors 26, 35 and 43 of the decade transistors $Q_2$, $Q_5$ and $Q_8$ for all-call or group-call use of the system.

As will be readily apparent, in the original condition of the system, due to the intentional unbalance in the initial decade 22 provided by the resistor $R_2$, the transistor $Q_2$ is always the conducting transistor when power is applied to the circuit. In this original condition there is no supply voltage for the second bistable decade circuit 23 or the third bistable decade 24.

When the tone "1" is received by the coil 15 of the multiple reed relay 14, the reed corresponding to the tone "1" starts to vibrate. When the first contact is made by this reed, the capacitor $C_6$ is discharged through the wire 25 and the diode $D_1$ into the collector 26 of transistor $Q_2$ and through the resistor $R_1$ to the base of the transistor $Q_1$. This short positive pulse is sufficient to make the bistable circuit flip to its other bistable condition.

As above mentioned, the transistor $Q_3$ comprises a PNP electronic switch transistor. Since the transistor $Q_1$ is now the conducting transistor in the first bistable circuit 22, the junction of $R_3$ and $R_4$ is now negative with respect to the emitter 30 of transistor $Q_3$. This junction supplies bias current to the base of the transistor $Q_3$ to saturate the transistor, which places the collector thereof approximately at the same positive potential as the supply voltage, namely, places the collector 31 at the same potential as the wire 27. Thus, the collector 31 applies the supply voltage potential to the bistable circuit 23 through the resistor $R_7$, which will become active, with the transistor $Q_5$ as the conducting transistor.

The resistor $R_7$ and the capacitor $C_2$ define a time delay circuit having a relatively long time constant, as above explained, for the delay of application of the supply voltage to the second bistable circuit for the following purpose: Assume that the coding, instead of being "179"

has been "111." This would mean that the diodes $D_1$, $D_2$ and $D_3$ would all be connected to the same reed, namely, the reed corresponding to the tone "1" of the reed bank relay 14. Although the capacitor $C_6$ is very small and is charged through a relatively high resistance $R_{21}$, it requires several vibrations of the reed corresponding to tone "1" to discharge it to the point where it is unable to fire another bistable circuit. The time delay in the switched supply voltage to the second bistable circuit, provided by resistor $R_7$ and condenser $C_2$, insures that the capacitor $C_6$ will be sufficiently discharged so that it will be unable to flip the bistable circuit 23 until the first tone is discontinued and the condenser $C_6$ is again allowed to charge through the resistor $R_{21}$ to its peak value. Therefore, when a second tone corresponding to "1" is received, the voltage delivered from the reed through the diode $D_2$ will be high for the first few vibrations, since the condenser $C_6$ will have been previously charged to peak value during the time interval between the tones. This insures that the decades will be operated in proper sequence, even though the tone series comprises successive tones of the same frequency, such as the tone frequency corresponding to the number "111," above mentioned.

Returning now to the operation of the circuit shown in FIGURE 2, namely, the circuit responding to the tone frequency corresponding to the number "179," as above mentioned, with the first tone, namely, corresponding to the number "1," the second decade 23 has been activated, whereby the transistor $Q_5$ is conducting, this circuit being similar to the first decade circuit 22 in that it has an intentional unbalance in its DC bias conditions, produced by the resistor $R_9$. When the reed corresponding to the tone "7" begins to vibrate, the first few pulses through the diode $D_2$ will be of sufficient amplitude to fire the second decade circuit 23, providing an action similar to that described in connection with the first decade circuit 22. Transistor $Q_6$ receives base current through the resistor $R_{10}$ and saturates. The collector 33 of transistor $Q_6$ supplies the operating voltage through the time delay circuit defined by resistor $R_{14}$ and condenser $C_4$. This places the third decade circuit 24 in condition to be fired when the reed associated with the tone "9" vibrates. When this reed vibrates it applies a pulse through the diode $D_3$ to the collector 43 of the transistor $Q_8$, which has been placed at operating potential by the firing of the switching transistor $Q_6$, as above described. The circuit 24 flips, in the same manner as previously described in connection with the circuit 22, whereby the transistor $Q_7$ is conducting, so that the voltage at the junction between resistors $R_{17}$ and $R_{18}$ is applied to the base of the switching transistor $Q_9$, rendering this transistor conducting and thereby connecting the operating voltage from the wire 40 to the output conductor 45 through the collector 21 of transistor $Q_9$, thus applying said operating voltage to the device 13.

To reset the recorder 12, a tone "11" is applied to the relay 14, causing the corresponding reed vibrate. This intermittently connects he wire 18 to the collector 28 of transistor $Q_1$ through the diode $D_4$. The initial pulse provided from the condenser $C_6$ is conducted through the diode $D_4$ and transmitted through condenser $C_1$ to the base of transistor $Q_2$, thus firing the first bistable circuit 22 back to its original condition, in which transistor $Q_2$ is the conducting transistor. Since transistor $Q_1$ is now not conducting, the junction of resistors $R_3$ and $R_4$ is at the same potential as the emitter of transistor $Q_3$, which turns this transistor off and removes all supply voltage from the second and third bistable circuits 23 and 24.

As will be readily apparent, the selection of the coding or the "number" of the decoder is made by connecting the diodes $D_1$, $D_2$ and $D_3$ to the desired reeds of the reed bank relay 14. The diode $D_1$ is the input element for the "hundreds" decade, the diode $D_2$ is the input for the "tens" decade and the diode $D_3$ is the input for the "units" decade.

The twelfth tone is for an all-call or group-call use of the system. As above mentioned, the reed 16, vibrated by the twelfth tone, is connected through the bypass diodes $D_5$ and $D_6$ and $D_7$ to the respective collectors 26, 35 and 43 of the decade circuits 22, 23 and 24. Let us assume that there are 1000 decoders in the system, with 1000 individual coding numbers. Although there are 1000 different connectors to the diodes $D_1$, $D_2$ and $D_3$, all the decoders in the system have bypass diodes $D_5$, $D_6$ and $D_7$ connected identically to their reeds 16. If the twelfth tone, namely, the tone required to vibrate the reed 16, is received three times, all 1000 decoders in the system will be energized. If, however, said twelfth tone is received only two times, it will fire the first and second decades 22 and 23 in all 1000 decoders, which means that there will be ten groups of 100 that may be turned on by receiving the tone corresponding to the last digit of their code numbers. For example, if the twelfth tone, namely the tone required to vibrate the reed 16, is received twice, and then the tone required to vibrate the "9" reed is received, all decoders with code numbers ending in "9" will be turned on.

As will be readily apparent, the decoding system of the present invention is exceedingly flexible, since by adding decades, an infinite number of decoders may be employed in the system with a correspondingly large number of individual coding numbers. With each added decade, with a correspondingly multiplied number of available receiving stations for the system, it is only necessary to use one additional tone in the calling signal.

While a specific embodiment of an improved selective decoding system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a decoding system, a multiple-resonant relay having a plurality of frequency-responsive circuit closers, each closing in response to the reception of a predetermined signal frequency by said relay, a source of operating voltage, a capacitor, means to charge said capacitor from said source, means to maintain said capacitor continuously charged in the absence of a signal, a plurality of two-element bistable flip-flop circuits, each being responsive to a separate tone of a coding signal and each having a normal unbalance such that one element thereof is in a normally conductive condition and the other element is normally non-conductive, a discharge circuit connected to said capacitor and including one of said frequency-responsive circuit closers, whereby said capacitor discharges responsive to the reception of the predetermined signal frequency by said relay required to close said one of said frequency-responsive circuit closers, means to overcome the unbalance and render said other element of at least one of the flip-flop circuits conducting responsive to discharge of said capacitor, an output circuit, and means to energize said output circuit responsive to the conduction of said other element.

2. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, means to maintain said capacitor continuously charged in the absence of a signal, a plurality of two-element bistable flip-flop circuits, each being responsive to a separate tone of a coding signal and each having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome the unbalance and render said other element of at least one of the flip-flop circuits conducting responsive to discharge of said capacitor, an output circuit, and means to energize said output circuit responsive to the conduction of said other element.

3. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, means to maintain said capacitor continuously charged in the absence of a signal, a plurality of two-element bistable flip-flop circuits, each being responsive to a separate tone of a coding signal and each having a normal unbalance such that one element thereof is in a normally conductive condition and the other element thereof is normally non-conductive, a discharge circuit connected to said capacitor and including one of said reeds and its associated stationary contact, whereby said capacitor discharges responsive to the vibration of said one reed, means to overcome the unbalance and render said other element of at least one of the flip-flop circuits conducting responsive to discharge of said capacitor, an output circuit, and means connecting said source to said output circuit responsive to the conduction of said other element.

4. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, means to maintain said capacitor continuously charged in the absence of a signal, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conducting responsive to discharge of said capacitor, a second two-element unbalanced bistable flip-flop circuit having a normally conductive element and a normally non-conducting element, means to provide a further discharge of said capacitor responsive to vibration of another reed, circuit means interconnecting the output of the first flip-flop circuit and the input of the second flip-flop circuit acting responsive to the conduction of said other element and said further discharge of said capacitor to render said last-named non-conducting element conducting, an output circuit, and means to energize said output circuit responsive to the conduction of said last-named normally non-conducting element.

5. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, means to maintain said capacitor continuously charged in the absence of a signal, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conductive responsive to discharge of said capacitor, a second two-element unbalanced bistable flip-flop circuit having a normally conductive element and a normally non-conductive element, means to provide a further discharge of said capacitor responsive to vibration of another reed, circuit means interconnecting the output of the first flip-flop circuit and the input of the second flip-flop circuit acting responsive to the conduction of said other element and said further discharge of said capacitor to render said last-named normally non-conductive element conducting, an output circuit, means to energize said output circuit responsive to the conduction of said last-named normally non-conductive element, and means to introduce a time delay between the conduction of said other element and said last-named normally non-conductive element.

6. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conducting responsive to discharge of said capacitor, a second two-element unbalanced bistable flip-flop circuit having a normally conductive element and a normally non-conductive element, means to provide a further discharge of said capacitor responsive to vibration of another reed, circuit means interconnecting the output of the first flip-flop circuit and the input of the second flip-flop circuit acting responsive to the conduction of said other element and said further discharge of said capacitor to render said last-named normally non-conductive element conducting, an output circuit, means to energize said output circuit responsive to the conduction of said last-named normally non-conductive element, and means to introduce a time delay between the conduction of said other element and said last-named normally non-conductive element, said time delay means comprising a resistance connected between the output of said first bistable flip-flop circuit and the input of said second bistable flip-flop circuit and a capacitance connected across the input of said second bistable flip-flop circuit.

7. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, means to maintain said capacitor continuously charged in the absence of a signal, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conducting responsive to discharge of said capacitor, a second two-element unbalanced bistable flip-flop circuit having a normally conductive element and a normally non-conductive element, means to provide a further discharge of said capacitor responsive to vibration of another reed, circuit means connected between the output of said first-named flip-flop circuit and the input circuit of said second flip-flop circuit and including a normally non-conducting electronic switch, means responsive to the conduction of said other element to close said electronic switch, means responsive to said further discharge of said capacitor to render said last-named normally non-conductive element conducting, an output circuit, and means to energize said output circuit responsive to the conduction of said last-named normally non-conductive element.

8. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capaictor discharges responsive to the vibration of said one reed, means to overcome said unbalance and render said other element conducting responsive to discharge of said capacitor, a second two-element unbalanced bistable flip-flop circuit having a normally conductive element and a normally non-conductive element, means to provide a further discharge of said capacitor responsive to vibration of another reed, circuit means connected between the output of said first-named flip-flop circuit and the input circuit of said second flip-flop circuit and including a normally non-conducting electronic switch, means responsive to the conduction of said other element to close said electronic switch, means responsive to said further discharge of said capacitor to render said last-named normally non-conductive element conducting, an output circuit, means to energize said output circuit responsive to the conduction of said last-named normally non-conductive element, and means to introduce a time delay between the conduction of said other element and said last-named normally non-conductive element, said time delay means comprising a resistance connected between the output of said first bistable flip-flop circuit and the input of said second bistable flip-flop circuit and the capacitance connected across the the input of said second bistable flip-flop circuit.

9. In a decoding system, a multiple-reed relay adapted to receive a coding signal and to vibrate selected reeds thereof in accordance with tones present in the coding signal, said relay having respective stationary contacts enagageable by said reeds when they vibrate, a source of operating voltage, a capacitor, means to charge said capacitor from said source, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conducting responsive to discharge of said capacitor, a second two-element unbalanced bistable flip-flop circuit having a normally conductive element and a normally non-conductive element, means to provide a further discharge of said capacitor responsive to vibration of another reed, circuit means connected between the output of said first-named flip-flop circuit and the input circuit of said second flip-flop circuit and including a normally non-conducting electronic switch, means responsive to the conduction of said other element to close said electronic switch, means responsive to said further discharge of said capacitor to render said last-named normally non-conductive element conducting, an output circuit, means to energize said output circuit responsive to the conduction of said last-named normally non-conductive element, means to introduce a time delay between the conduction of said other element and said last-named normally non-conducting element, said time delay means comprising a resistance connected between the output of said first bistable flip-flop circuit and the input of said second bistable flip-flop circuit and a capacitance connected across the input of said second bistable flip-flop circuit, reset circuit means connected between said first-named capacitor and said first-named normally conductive element and including another of the reeds and its associated contact, and means to restore the original unbalance in said first-named bistable circuit responsive to discharge of said first-named capacitor through said last-named reed and contact.

10. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conducting responsive to discharge of said capacitor, a second two-element unbalanced bistable flip-flop circuit having a normally conductive element and a normally non-conductive element, means to provide a further discharge of said capacitor responsive to vibration of another reed, circuit means connected between the output of said first-named flip-flop circuit and the input circuit of said second-named flip-flop circuit and including a normally non-conducting electronic switch, means responsive to the conduction of said other element to close said electronic switch, means responsive to said further discharge of said capacitor to render said last-named normally non-conductive element conducting, an output circuit, means to energize said output circuit responsive to the conduction of said last-named normally non-conductive element, means to introduce a time delay between the conduction of said other element and said last-named normally non-conductive element, said time delay means comprising a resistance connected between the output of said first bistable flip-flop circuit and the input of said second bistable flip-flip circuit and a capacitance connected across the input of said second bistable flip-flop circuit, and by-pass circuit means connected across said first-named reed and its associated contact and said another reed and its associated contact, said by-pass circuit means including still another reed and its associated contact.

11. In a decoding system, a multiple-reed relay adapted to receive a coding signal and to vibrate selected reeds thereof in accordance with tones present in the coding signal, said relay having respective stationary contacts engageable by said reeds when they vibrate, a source of operating voltage, a capacitor, means to charge said capacitor from said source, a two-element bistable flip-flop circuit having a normal unbalance such that one element thereof is in a normally conductive condition and the other element is normally non-conductive, a discharge circuit connected to said capacitor and including one of said reeds and its associated stationary contact, whereby said capacitor discharges responsive to the vibration of said one reed, means to overcome said unbalance and render said other element conducting responsive to discharge of said capacitor, a second two-element unbalanced bistable flip-flop circuit having a normally conductive element and a normally non-conductive element, means to provide a further discharge of said capacitor responsive to vibration of another reed, circuit means connected between the output of said first-named flip-flop circuit and the input circuit of said second flip-flop circuit and including a normally non-conducting electronic switch, means responsive to the conduction of said other element to close said electronic switch, means responsive to said further discharge of said capacitor to render said last-named normally non-conductive element conducting, an output circuit, means to energize said output circuit responsive to the conduction of said last-named normally non-conductive element, means to introduce a time delay between the conduction of said other element and said last-named normally non-conductive element, said time delay means comprising a resistance connected between the output of said first bistable flip-flop circuit and the input of said second bistable flip-flop circuit and a capacitance connected across the input of said second bistable flip-flop circuit, by-pass circuit means connected across said first-named reed and its associated contact and said another reed and its associated contact, said by-pass circuit means including still another reed and its associated contact, reset circuit means connected between said first-named capacitor and said first-named normally conductive element and including another of the reeds and its associated contact, and means to restore the original unbalance in said first-named bistable circuit responsive to discharge of said first-named capacitor through said last-named reed and contact.

References Cited by the Examiner

UNITED STATES PATENTS 2,600,405 6/52 Hoeppner ____________ 340—171
2,912,574 11/59 Gensel __________ 340—171 XR NEIL C. READ, *Primary Examiner.*